(12) United States Patent
Bradley et al.

(10) Patent No.: US 11,097,791 B2
(45) Date of Patent: Aug. 24, 2021

(54) RESILIENT GAP REDUCING SUPPORT STRUCTURES AND METHODS

(71) Applicant: COMPAGNIE GENERALE DES ETABLISSMENTS MICHELIN, Clermont-Ferrand (FR)

(72) Inventors: Calvin Rhett Bradley, Greenville, SC (US); Parker Baxter, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 16/759,160

(22) PCT Filed: Oct. 25, 2017

(86) PCT No.: PCT/US2017/058192
§ 371 (c)(1),
(2) Date: Apr. 24, 2020

(87) PCT Pub. No.: WO2019/083518
PCT Pub. Date: May 2, 2019

(65) Prior Publication Data
US 2021/0171131 A1 Jun. 10, 2021

(51) Int. Cl.
*B62D 35/00* (2006.01)
(52) U.S. Cl.
CPC ......... *B62D 35/001* (2013.01); *B62D 35/002* (2013.01); *B62D 35/008* (2013.01)
(58) Field of Classification Search
CPC .... B62D 35/00; B62D 35/001; B62D 35/002; B62D 35/008
(Continued)

(56) References Cited

U.S. PATENT DOCUMENTS

| 3,711,146 A | 1/1973 | Madzsar et al. |
| 4,291,911 A | 9/1981 | Gallmeyer |

(Continued)

FOREIGN PATENT DOCUMENTS

| CN | 108430860 A | 8/2018 |
| JP | 2003011855 A | 1/2003 |

(Continued)

OTHER PUBLICATIONS

International Search Report and Written Opinion for PCT/2017/058192 dated Jul. 18, 2018.

*Primary Examiner* — Jason S Daniels
(74) *Attorney, Agent, or Firm* — Hahn Loeser & Parks LLP; Bret A. Hrivnak

(57) ABSTRACT

Embodiments provide a gap reducer and a method of mounting the gap reducer to a vehicle. Such method includes attaching operably a bi-modulus bending member to a first vehicle in a cantilevered configuration along a vertical side of the first vehicle, where a cantilevered end of the bi-modulus bending member is arranged to extend within a gap arranged between the first vehicle and a second vehicle when the first and second vehicles are coupled. The bi-modulus bending member comprises an elongate bending element configured to elastically buckle and bend to a buckled configuration when a force component exceeds a threshold buckling force, and to elastically return to an unbuckled configuration when the force component is reduced below the threshold buckling force. A gap reducer panel is operably coupled to the bi-modulus bending member, the gap reducer panel having a length extending primarily in a vertical direction.

20 Claims, 6 Drawing Sheets

(58) Field of Classification Search
USPC .......................................... 296/180.2, 180.4
See application file for complete search history.

(56) References Cited

U.S. PATENT DOCUMENTS

| | | | |
|---|---|---|---|
| 4,611,847 A | 9/1986 | Sullivan | |
| 4,749,538 A | 6/1988 | Anderson | |
| 5,267,523 A | 12/1993 | Hugron | |
| 5,277,146 A | 1/1994 | Hughes, Jr. | |
| 7,093,889 B2 | 8/2006 | Graham | |
| 7,347,019 B1 | 3/2008 | Shaw | |
| 7,578,541 B2 | 8/2009 | Layfield et al. | |
| 7,686,385 B2 | 3/2010 | Dolan et al. | |
| 7,942,467 B2 | 5/2011 | Boivin et al. | |
| 8,303,025 B2 | 11/2012 | Senatro | |
| 8,678,474 B1 | 3/2014 | Boivin et al. | |
| 8,727,425 B1 | 5/2014 | Senatro | |
| 8,827,351 B1* | 9/2014 | Kenevan | B62D 35/001 296/180.4 |
| 8,919,863 B2 | 12/2014 | Layfield et al. | |
| 9,004,575 B2 | 4/2015 | Grandominico et al. | |
| 9,272,741 B2 | 3/2016 | Gerst | |
| 9,714,057 B2* | 7/2017 | Smith | B62D 35/001 |
| 9,751,573 B2 | 9/2017 | Senatro | |
| 10,577,033 B2 | 3/2020 | Macherel et al. | |
| 10,640,156 B2* | 5/2020 | Boivin | B62D 35/001 |
| 10,696,335 B2 | 6/2020 | Macherel et al. | |
| 10,710,648 B2 | 7/2020 | Macherel et al. | |
| 2003/0057736 A1 | 3/2003 | Long et al. | |
| 2003/0227194 A1* | 12/2003 | Farlow | B62D 35/001 296/180.4 |
| 2009/0189414 A1 | 7/2009 | Boivin et al. | |
| 2009/0218848 A1* | 9/2009 | Boivin | B62D 35/001 296/180.4 |
| 2010/0264690 A1 | 10/2010 | Brown et al. | |
| 2010/0264691 A1 | 10/2010 | Giromini et al. | |
| 2011/0253851 A1 | 10/2011 | Di Franco | |
| 2011/0285167 A1 | 11/2011 | Butler | |
| 2012/0074728 A1 | 3/2012 | Senatro | |
| 2012/0139290 A1* | 6/2012 | Kenevan | B62D 35/001 296/180.3 |
| 2013/0270857 A1 | 10/2013 | Brown et al. | |
| 2013/0285411 A1 | 10/2013 | Layfield et al. | |
| 2014/0028050 A1 | 1/2014 | Rodriguez | |
| 2014/0270940 A1 | 9/2014 | Butler et al. | |
| 2014/0300134 A1 | 10/2014 | Gerst | |
| 2014/0319871 A1 | 10/2014 | Gan et al. | |
| 2014/0353443 A1 | 12/2014 | Kuo | |
| 2015/0259014 A1 | 9/2015 | Baker et al. | |
| 2015/0321706 A1* | 11/2015 | Smith | B62D 33/06 296/180.2 |
| 2017/0015369 A1 | 1/2017 | Senatro | |
| 2017/0029044 A1 | 2/2017 | Senatro | |
| 2018/0093719 A1 | 4/2018 | Emery et al. | |
| 2018/0281875 A1 | 10/2018 | Macherel et al. | |

FOREIGN PATENT DOCUMENTS

| | | |
|---|---|---|
| JP | 2013237423 A | 11/2013 |
| JP | 2015229464 A | 12/2015 |
| WO | 2017059330 A1 | 4/2017 |

* cited by examiner

RESILIENT GAP REDUCING SUPPORT STRUCTURES AND METHODS

FIELD

This disclosure relates generally to gap reducers for vehicles.

BACKGROUND

Space between coupled vehicles, such as between a tractor and a towed trailer or between coupled trailers, is often provided to enable vehicle articulation during turning maneuvers. However, this spacing creates additional aerodynamic drag, thereby increasing operating costs due to reduced fuel mileage. Gap reducers have been employed to extend forward from trailers and into this space to reduce this drag. Additionally, gap reducers may also extend rearward from a tractor or a leading trailer and into this space also to reduce this drag. In addition, gap reducers may reduce the size of a turbulent boundary layer that is created along the top and side of the trailer. This impact can complement aerodynamic devices at the back of the trailer. However, when these gap reducing devices extend closer together under significant articulation, impacts can occur between the tractor and trailer. In addition trailers parked in lots may get hit by other trailers while maneuvering in busy and crowded locations. These may cause damage to the aerodynamic gap reducer. Therefore, there is a need to provide a gap reducer that allows an impact to significantly deform the gap reducer without permanently damaging the gap reducer and which also maintains a rigid configuration during normal operating conditions.

SUMMARY

Embodiments of this disclosure include methods of mounting a gap reducer to a vehicle. One step includes attaching operably a bi-modulus bending member to a first vehicle in a cantilevered configuration along a vertical side of the first vehicle, where a cantilevered end of the bi-modulus bending member is arranged to extend within a gap arranged between the first vehicle and a second vehicle when the first and second vehicles are coupled. The bi-modulus bending member comprising an elongate bending element having a length, width, and height, each extending perpendicular to the other, the elongate bending member also having a cross-section extending perpendicular to the length in both the direction of the width and in the direction of the height of the elongate bending element, the width being greater than the height in an unbuckled arrangement and the cross-section of the elongate bending element being asymmetric relative to a centerline extending in the direction of the elongate bending element width, the centerline located midway along the height, where each of the bi-modulus bending member and the elongate bending element is configured to elastically buckle and bend to a buckled configuration when a force component exceeds a threshold buckling force, and to elastically return to an unbuckled configuration when the force component is reduced below the threshold buckling force. Another step includes coupling operably a gap reducer panel to the bi-modulus bending member, the gap reducer panel having a length extending primarily in a vertical direction and a height extending perpendicular to the length, where the gap reducer panel height extends in a direction away from the first vehicle and to the cantilevered end of the bi-modulus bending member.

Other embodiments provide a gap reducer apparatus, which includes a vehicle mounting bracket configured for mechanically coupling the apparatus to a vertical side of a vehicle. Such apparatus also includes a bi-modulus bending member comprising an elongate bending element having a length, width, and height, each extending perpendicular to the other, the elongate bending member also having a cross-section extending perpendicular to the length in both the direction of the width and in the direction of the height of the elongate bending element, the width being greater than the height in an unbuckled arrangement and the cross-section of the elongate bending element being asymmetric relative to a centerline extending in the direction of the elongate bending element width, the centerline located midway along the height, where each of the bi-modulus bending member and the elongate bending element is configured to elastically buckle and bend to a buckled configuration when a force component exceeds a threshold buckling force, and to elastically return to an unbuckled configuration when the force component is reduced below the threshold buckling force.

The foregoing and other objects, features and advantages of the disclosure will be apparent from the following more detailed descriptions of particular embodiments, as illustrated in the accompanying drawings wherein like reference numbers represent like parts of the disclosure.

DETAILED DESCRIPTION

Figure 1:
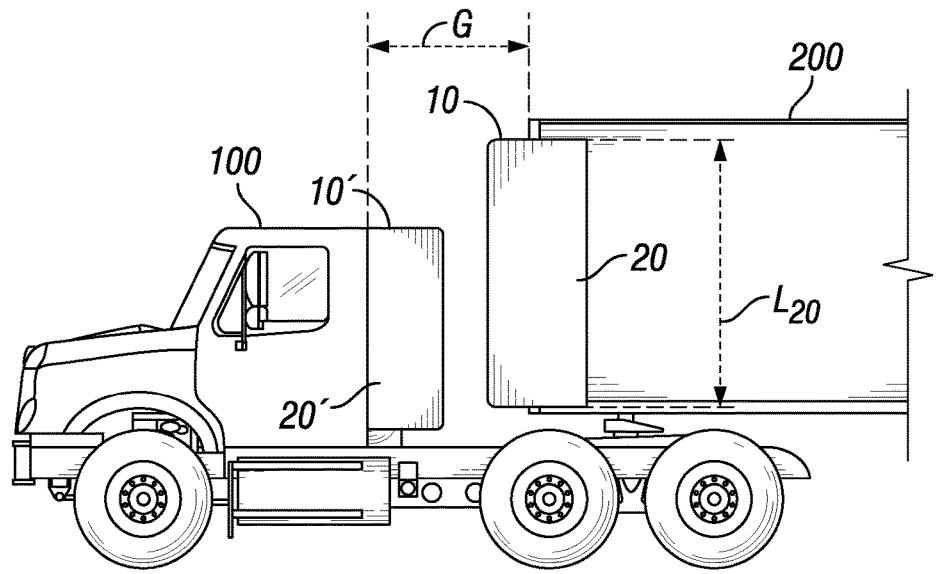
FIG. 1 is a side view of a tractor and trailer between which a gap reducer is arranged along a front side of the trailer within a gap located between the tractor and trailer, in accordance with an exemplary embodiment.

Embodiments discussed herein include gap reducers, methods for mounting a gap reducer to a vehicle, and coupling apparatuses for achieving this purpose.

A gap reducer is employed to partially or substantially fill a gap (void) between a first vehicle, such a trailer, and a second vehicle to which the first vehicle is coupled, such as a tractor or another trailer, with the intent of improving aerodynamic performance A gap reducer generally includes a gap reducer panel forming a sheet or panel of relatively thin material extending outwardly from a vehicle and into the gap. Most commonly, the gap reducer extends a height outwardly from a side of a vehicle and into the gap, such that a length of the gap reducer extends substantially in a vertical direction. The side of the vehicle from which the gap reducer extends is a side that extends primarily in a vertical direction, such as a front end side or a read end side of the vehicle that defines the gap. It follows, that a gap reducer would not be arranged at a front side end or a rear side end that does not form or define a gap between coupled vehicles, such as a tractor and trailer, In an optional arrangement, a gap reducer may be arranged such that its length extends primarily in a direction of the vehicle width, such as, for example, between opposing, spaced-apart primarily vertically arranged gap reducers. Of course, in certain instances, only a widthwise gap reducer may be employed without use of any such vertically arranged gap reducers. In such instances, this widthwise-extending gap reducer also extends from a vertical side of the vehicle and into the gap.

To allow a flexible gap reducer panel to bend only when a force applied thereto exceeds a threshold buckling force, and thereafter, when the force is no longer applied or is reduced below the threshold force, to elastically return substantially to its original shape and orientation, a bi-modulus bending member is employed. This bi-modulus bending member bends only when a force applied thereto exceeds a threshold buckling force, and thereafter, when the force is no longer applied or is reduced below the threshold buckling force, elastically returns substantially to its original unbuckled shape and orientation. This return may or may not be automatic, meaning it may return to its unbuckled arrangement automatically without application of a return force or it may return to its unbuckled arrangement with application of a return force, the return force including a force component applied in a direction opposite to the threshold buckling force to urge the bi-modulus bending member to its unbuckled arrangement. In certain instances, a buckled bi-modulus bending member will return to its unbuckled arrangement either when the bending force being applied is reduced to or below a threshold unbuckling force or when a return force being applied is at or above a threshold return force lower than the threshold buckling force.

The bi-modulus bending member includes one or more elongate bending elements. To provide the bi-modulus behavior characterizing the bi-modulus bending member, each elongate bending element is also characterized as having a bi-modulus behavior, the difference being that the bi-modulus behavior of the bi-modulus bending member can be altered or controlled by altering the quantity of elongate members used to form the bi-modulus bending member and/or altering the orientation of any one or more elongate bending elements within the bi-modulus bending member. Accordingly, each elongate bending element, alone, is configured to bend only when a force applied thereto exceeds a threshold buckling force, and thereafter, when the force is no longer applied or is reduced below the threshold buckling force, elastically returns substantially to its original unbuckled shape and orientation. This return may or may not be automatic, meaning it may return to its unbuckled arrangement automatically without application of a return force or it may return to its unbuckled arrangement with application of a return force, the return force including a force component applied in a direction opposite to the threshold buckling force to urge the elongate bending element to its unbuckled arrangement. In certain instances, a buckled elongate bending element will return to its unbuckled arrangement either when the bending force being applied is reduced to or below a threshold unbuckling force or when a return force being applied is at or above a threshold return force lower than the threshold buckling force. It follows that when a bi-modulus bending member is formed from a single elongate bending element, the threshold buckling and threshold unbuckling forces of the bi-modulus bending member are generally the same as the elongate bending element. To the contrary, when a plurality of elongate bending elements are employed to form a bi-modulus bending member, the threshold buckling and unbuckling forces the bi-modulus bending member are greater than those of any elongate bending element of the plurality used to form the bi-modulus bending member.

Each elongate bending element having a length, width, and height, each extending perpendicular to the other. The elongate bending member also has a cross-section extending perpendicular to the length in both the direction of the width and in the direction of the height of the elongate bending element. The length extends in a direction of a bi-modulus bending member length, while the width and height each extend in a direction perpendicular to each other and the length of the elongate bending element, respectively. With regard to the bi-modulus bending member, each elongate bending element is arranged such that its width extends in a direction of the bi-modulus bending member width and parallel to or coplanar with a central plane (referred to as a bending plane) of the bi-modulus bending member. The height of each elongate bending element extends in a direction perpendicular to the width, and therefore perpendicular to the central plane of the bi-modulus bending member.

An elongate bending element, as well as the bi-modulus bending member, is characterized as having a cross-sectional shape taken normal to its length and configured to achieve a bi-modulus cross-section, where a bi-modulus cross-section forms a bi-stable structure that is stable in two cross-sectional shapes. In this case, the two cross-sectional shapes are unbuckled and buckled cross-sections. This bi-modulus cross-section of the elongate bending element extends a desired height and width of the elongate bending element and is asymmetric relative to a centerline extending across the cross-section in the direction of the elongate bending element width at a location centered along the elongate bending element height. In certain instances, the cross-section of a bi-modulus bending member is characterized in the same manner with reference to the height and width of the bi-modulus bending member. In being asymmetric, any such cross-section has a protruding side and a recessed side, meaning, on one side of the thickness, at least a portion of the cross-section protrudes outwardly in the direction of the cross-section or element height, termed herein as a protrusion. On the other side of the thickness associated with the protrusion is a corresponding recess. With regard to the cross-section, the side of the thickness from which protrusion extends outwardly in a direction away from centerline is referred to as a protruding side of the thickness while the opposing side of the thickness corresponding to the protrusion is referred to as a recessed side of the thickness. As a result, when arranging any such elongate bending element or a plurality thereof in a stacked arrangement within a bi-modulus bending member, bi-modulus bending member is also characterized as having a protruding side and a recessed side relative to thickness. It is appreciated that bending may occur more easily in the direction of the recessed side. Therefore, when it is desirous for the bi-modulus bending member to bend in a certain direction, aligning the bi-modulus bending member such that the recessed side faces the certain bending direction may be desired.

It is appreciated that in forming such a bi-modulus (bi-stable) cross-section, the cross-section may be arcuate, much like a tape measure, which can be termed "U" shaped, or the cross-section may be formed of linear components to form a "V" shape. In each instance, the outer side of the "U" or "V" is the protruding side of the cross-section/cross-sectional thickness, while the inner side of the "U" or "V" is the recessed side of the cross-section/cross-sectional thickness. The protruding side in these instances can also be referred to as a convex side and the recessed side as a concave side. In lieu of the entire cross-section being used to form the "U" or "V" shape, one or more portions may be "U" or "V" shaped while other portions of the cross-section extend substantially in the direction of elongate bending element width (that is, substantially parallel to elongate bending element width), where substantially in this instance connotes being within 5 degrees of being parallel with the widthwise direction. In such instances, where one "U" or "V" shaped protrusion is provided, the protrusion is located midway (centered) across the cross-section width, although the protrusion may be located elsewhere across the cross-section width in other variations. Lastly, it is appreciated that the central peak, where opposing legs intersect, for any "U" or "V" shape may be pointed in the case of a "V" or rounded in the case of "U", but in each case, may also be flat or linear.

Each protrusion can be described as a having a height. In instances where the "U" or "V" shape is formed using the entire cross-section, a protrusion height is equal to the cross-section height. In instances where the protrusion only forms a portion of the cross-section, the protrusion height extends from portions extending substantially parallel to the widthwise direction. In certain exemplary instances, the protrusion height is equal to a distance of 6 to 20 mm. It is appreciated that for any "U" or "V" shape, the legs of each may be biased relative to the direction of the element or cross-section height (that is, a direction normal to the widthwise direction of the element or cross-section), such that an angle greater than zero (0) separates the legs. For example, the angle may comprise any angle ranging from 140 to 160 degrees. Lastly, a protrusion can be described as a having a width (maximum width). In instances where the "U" or "V" shape is formed using the entire cross-section, protrusion width is equal to the cross-section width. In instances where the protrusion only forms a portion of the cross-section, the protrusion width is equal to a distance of 40 to 100 mm. Of course, for any such dimension provided, different dimensions may be employed for other situations, as the dimensions provided are only provided for exemplary purposes. In any event, however, the height of the cross-section or element is always less than the corresponding width of the cross-section or element. The same is true for the height and width of any bi-modulus bending member.

In instances where multiple elongate bending elements are employed, it is appreciated that two or more elements of the same or different design may be arranged in a stacked arrangement where for the stacked elements, an upper stacked element and a lower stacked element are arranged such that a recessed side of the upper stacked element is arranged to face a protruding side of the lower stacked element. Additionally, or in the alternative, in instances where multiple elongate bending elements are employed, a first element of the same or different design may be arranged relative to a second element such that a recessed side of the first element faces a recessed side of the second element. In such instances, the resulting bi-modulus bending member may be configured to more willingly bend in opposing directions, that is, unless one or more additional elements are stacked on one or both first and second element as previously described such that a different quantity of first and second elements face one another. In each of these instances, the lengths of all elongate bending elements extend in the same direction, that is, in the direction of the bi-modulus bending member length.

In operation, when bending, the bi-modulus bending member buckles (that is, the cross-section buckles), whereby the cross-section shape (profile) changes from a first cross-section shape to a second cross-section shape. By doing so, the bi-modulus bending member and each of the one or more elongate bending elements elastically buckle and bend to a buckled configuration when an applied force (such as its lateral force component) exceeds a threshold buckling force and elastically returns to an unbuckled or unbent configuration when the applied force is reduced below the threshold buckling force or removed. Stated differently, the bi-modulus bending member, and each elongate bending element, can be characterized as being a bi-modulus (or bi-stable) member, where each member or element resists bending with a first bending modulus until it buckles or collapses and thereafter bending ensues without any notable plastic deformation or resistance, where the buckled cross-section has a second bending modulus.

In particular embodiments, the bi-modulus characteristic is accomplished by the elongate bending element being a thin-walled member, having a sufficiently thin thickness, such as a thickness of 1.0 millimeters (mm) or less, or 0.5 mm or less, for example. In further embodiments, each elongate bending element has a thickness in the range of 0.25 mm to 0.75 mm. For those thicknesses identified in the previous two sentences, each elongate bending element is made from a sheet of stainless steel spring steel, and in other variations, made from any other material that would allow the elongate bending element, alone or together with any other elongate bending elements, to operate as a bi-modulus bending member. It is appreciated that when using any material other than stainless spring steel, such as any other spring steel or any other metal or polymeric material, for example, whether any such material is inelastic or elastic, the thickness of the elongate bending element has a thickness that may or may not be different from those thickness specifically identified above such as may be required to allow the elongate bending element, alone or together with any other elongate bending elements, to operate as a bi-modulus bending member. Again, by forming the elongate bending elements of sufficiently thin thicknesses, plastic deformation is significantly or fully eliminated, and thereby operating alone or in cooperation with other elongate bending elements with a bi-modulus characteristic, or stated differently, as a bi-modulus bending member.

It is appreciated that the thickness of any elongate bending element may remain constant or may vary in any lengthwise and/or widthwise direction of the elongate bending element. The selection of a thickness may be made in cooperation with the cross-sectional shape taken in a plane perpendicular to the lengthwise direction of the elongate bending element to arrive at the specific bi-modulus performance requirements desired for a specific use or installation.

It is appreciated that along the length of any elongate bending element, a location of minimum cross-section may be provided for the purpose of controlling the location at which buckling will occur along the length of the elongate bending element, where the location of buckling will be encouraged to occur at this location of minimum cross-section. This minimum cross-section may be formed by reducing the elongate member width and/or the elongate member height.

Methods for mounting a gap reducer to a vehicle include attaching a bi-modulus bending member to a trailer in a cantilevered configuration along a vertical side of the vehicle. Vertical side connotes a side of the vehicle having one or more surfaces extending primarily in a vertical direction (where a vertical direction extends 90 degrees from horizontal or a ground plane and primarily vertical extends in a direction greater than 45 degrees relative to horizontal or a ground plane). This vertical side may also extend in primarily in a direction of the vehicle width, such when the vertical side is a front or rear end side of the vehicle, or this vertical side may also extend in primarily in a direction of the vehicle length, such when the vertical side is a lengthwise side of the vehicle.

In the installed arrangement, the length of the bi-modulus bending member extends away from the vehicle to a cantilevered end primarily in a direction of the gap reducer panel height (or, in other words, in a direction substantially perpendicular to the gap reducer panel length). By doing so, when a force is applied the protruding portion of the gap reducer panel, and the force has a component normal to the length of the bi-modulus bending member where such component is equal to or greater than a threshold buckling force, the bi-modulus bending member will buckle to deflect the gap reducer away from the source of the applied force. In certain instances, it may be desired to predispose (bias) the bi-modulus bending member into deflecting in a preferred bending direction. In certain instances, for example, where it is desired to deflect the bi-modulus bending member towards a widthwise centerline of the vehicle, such as when the gap reducer protruding portion extends from a front or rear end side of the vehicle, the bi-modulus bending member length (or the elongate bending element length) extends from the vehicle in a direction away from the vehicle and in a direction towards a widthwise centerline of the vehicle extending lengthwise along the vehicle length. To assist in biasing the bi-modulus bending member to deflect in a desired direction, one or more tensioning members may be optionally employed, whereby a tensioning member is operably affixed at one end (a first end) near the cantilevered end of the gap reducer, such as by attaching the tensioning member near a cantilevered end of the bi-modulus bending member, any connector connecting the bi-modulus bending member to the gap reducer panel, or any other structure that may be located near the cantilevered end of the gap reducer. At the other end (a second end), a tensioning member may be affixed to any structure located outwardly from the first end, generally in the direction of desired deflection. Such structure may form a portion of the bi-modulus bending member, a vehicle mounting bracket used to attach the bi-modulus bending member to the vehicle, the vehicle itself, or any other structure affixed to the vehicle. A tensioning member may form any elongate member, such as a cable, rope, wire, elastic member, or the like, which is capable of applying a tensile force in an installed arrangement. Any such tensioning member may be employed in addition to or without the length of bi-modulus bending member being biased as discussed previously in this paragraph.

In operably attaching the bi-modulus bending member to the vehicle, it is appreciated that the bi-modulus bending member may be affixed directly to the vehicle or by way of one or more vehicle mounting brackets. In one example, the bi-modulus bending member is directly or indirectly mounted to a vertical side of the vehicle, where the bi-modulus bending member extends lengthwise into an intended gap, which may also be expressed as extending primarily in a direction of the gap reducer height or extending primarily normal to a vertical side of the vehicle. For example, this vertical side may be a front or rear end side of the vehicle, the front and end together defining a length of the vehicle. In lieu of a front or rear end side, the bi-modulus bending member may be operably attached to a longitudinal side of the vehicle, such as at a location near the front or rear end side, for example. It is appreciated that the bi-modulus bending member may be operably attached at any point along its length, including at a terminal end thereof. It is also appreciated that the bi-modulus bending member may be operably attached directly to the vehicle or to a vehicle mounting bracket in any desired manner, such as by use of one or more fasteners, weldments, adhesives, pins, and/or clamps, for example. Likewise, a vehicle mounting bracket may be operably formed integrally with the vehicle or attached to the vehicle directly or indirectly, using any additional bracket, as well as any one or more fasteners, weldments, adhesives, or clamps.

Such methods for mounting a gap reducer to a vehicle also include operably coupling a gap reducer panel to the bi-modulus bending member, thereby configuring the gap reducer panel in an installed arrangement. The gap reducer panel has a length extending primarily in a vertical direction and a height extending perpendicular to the length, where in the installed arrangement, the gap reducer panel extends in a direction away from the vehicle primarily in a direction of the gap to a cantilevered end of the gap reducer, where at least a portion of the gap reducer height and the cantilevered end (together forming a "protruding portion") is arranged within in the intended gap. In certain instances, as the protruding portion extends a direction away from the vehicle in primarily a direction of the gap reducer height to a cantilevered end, it may also extend partially in a direction transverse to both the height and length of the gap reducing panel, such as to extend towards a widthwise centerline of the vehicle when in an installed arrangement. For example, this may be employed when the bi-modulus bending member length at its cantilevered end is biased towards a widthwise centerline of the vehicle, as discussed previously. It is appreciated that at least a portion of the protruding portion of the gap reducer panel extending towards a widthwise centerline extends along an arcuate path. The arcuate path may form any desired arcuate path, while in certain instances, the arcuate path is defined by a constant radius. In certain instances, this constant radius may range from 500 millimeters to 1200 millimeters, or in more particular instances, from 700 millimeters to 900 millimeters.

In addition to coupling the gap reducer panel to the bi-modulus bending member (which is thereby operably attached to the vehicle), optionally, a separate portion of the gap reducer panel may be operably attached to the vehicle. It is appreciated that this additional portion of the gap reducer panel may be directly or indirectly attached in any manner, such as any member contemplated for operably attaching the bi-modulus bending member to the vehicle. It is appreciated that this additional portion of the gap reducer operably attached to the vehicle may operably attached to the same or different side of the vehicle as the bi-modulus bending member is operably attached. For example, in certain instances, while the bi-modulus bending member is operably attached to a front or rear end side of the vehicle, the gap reducer panel is also operably attached to a longitudinal side of the vehicle. It is lastly noted that in certain instances, this additional portion of the gap reducer panel operably affixed to the vehicle forms the opposing end of the panel opposite its cantilevered end, or at least a portion of the panel located near the opposing end of the panel.

It is appreciated that the gap reducer may operate with other gap reducers to fill the gap as desired. Therefore, the method can further include mounting two or more gap reducers with one or more bi-modulus bending members.

The methods generally described above, and the manner in which they are employed or practiced, are now discussed in further detail below with reference to various exemplary embodiments of the gap reducer and bi-modulus bending member.

Figure 2:
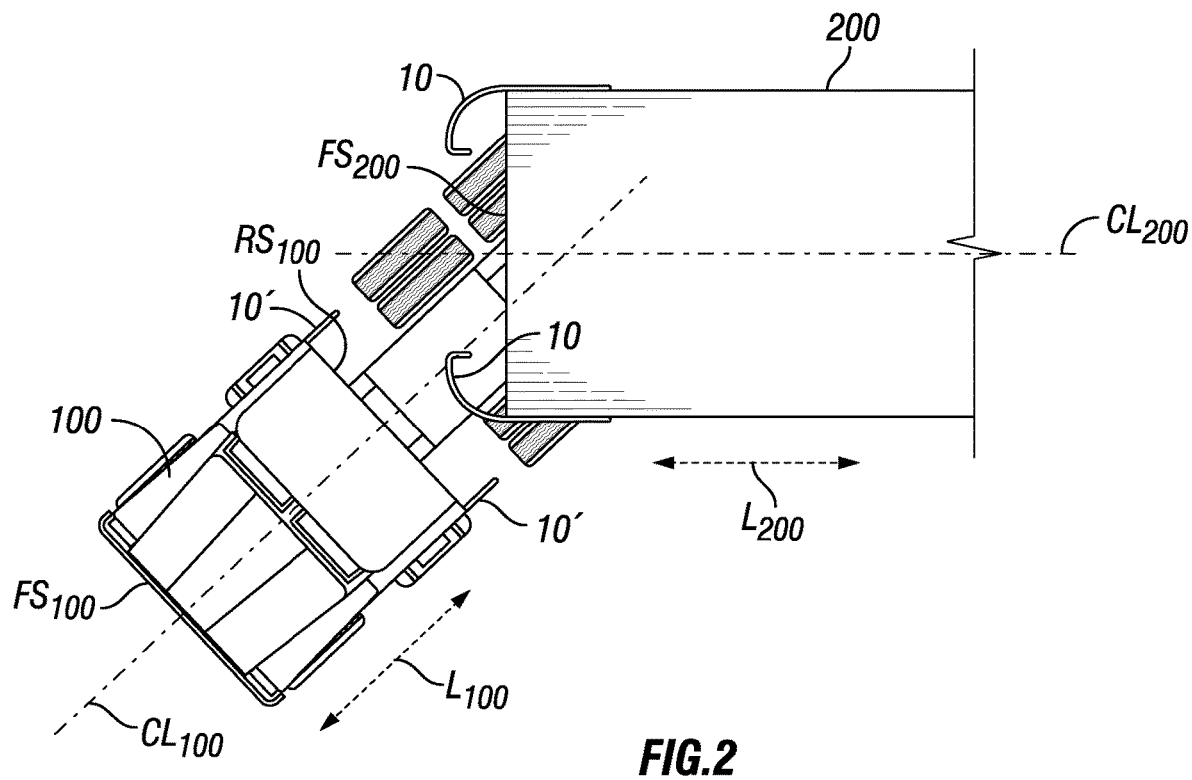
FIG. 2 is a top view of the tractor and trailer of FIG. 1, showing the tractor and trailer biased lengthwise to one another in a turning arrangement.

FIG. 1 depicts a tractor-trailer combination, with a gap (air gap) G arranged between tractor 100 and trailer 200. A gap reducer 10 is arranged in an installed arrangement to extend into gap G from a front side end $FS_{200}$ of trailer 200 in a cantilevered arrangement. A gap reducer 10' is also arranged in an installed arrangement to extend into gap G from a rear side end $RS_{100}$ of tractor 100 in a cantilevered arrangement. The trailer has a length $L_{200}$ extending from a trailer front end side $FS_{200}$ and to rear end side (not shown). Tractor 100 also has a length $L_{100}$ extending between a front side end $FS_{100}$ and a rear side end $RS_{100}$. More specifically, gap G extends from tractor rear end side $RS_{100}$ and trailer front end side $FS_{200}$. With reference now to FIG. 2, the tractor-trailer combination is arranged in a turning arrangement, showing how the gap G can become small and ultimately become eliminated when the tractor 100 or gap reducer 10' and gap reducer 10 contact.

Figure 3:
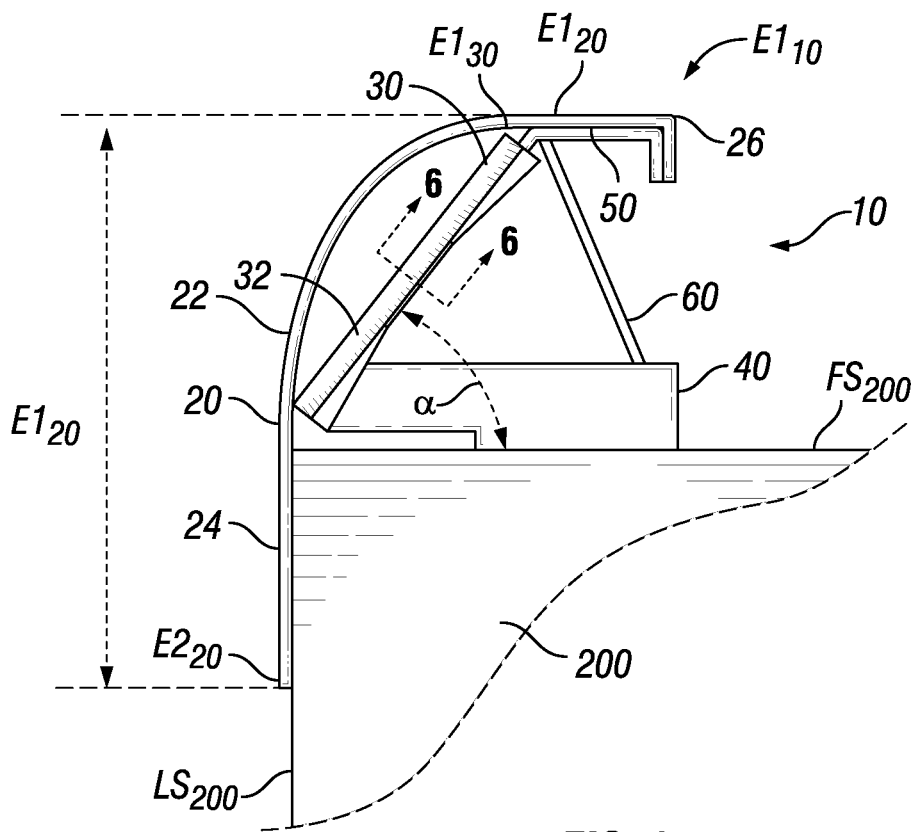
FIG. 3 is an enlarged top view of section 3 from FIG. 2, showing a gap reducer arranged along a front side of the trailer, along a vertical surface thereof.

With reference now to FIG. 3, a top view of gap reducer 10 is shown in an exemplary embodiment attached to a trailer 200 in an installed arrangement. In particular, gap reducer panel 20 is operably attached to trailer 200, where a protruding portion 22 of gap reducer panel 20 is operably attached to a trailer front side $FS_{200}$ by way of bi-modulus bending member 30, vehicle mounting bracket 40, and connector 50. The protruding portion 22 extends to a cantilevered end $E1_m$ of panel 20, which is operably attached to cantilevered end $E1_m$ of bi-modulus bending member 30. An additional portion 24 of gap reducer panel 20 is operably attached to trailer 200 along a longitudinal side $LS_{200}$ of trailer 200. This additional portion 24 includes a second end $E2_{20}$ of gap reducer panel 20, which is located opposite cantilevered end $E1_m$ relative to height $H_{20}$.

With reference to FIGS. 1-3, in an installed arrangement, gap reducer panel 20 is shown to have a length $L_{20}$ extending primarily in a vertical direction V and a height $H_{20}$ extending perpendicular to the length $L_{20}$, where the gap reducer panel 20 extends in a direction away from the trailer 200 and primarily in a direction of the gap G to a cantilevered end $E1_{20}$ at a cantilevered end $E1_{10}$ of the gap reducer 10. At least a portion of gap reducer panel height $H_{20}$ and cantilevered end $E1_{20}$, which together form protruding portion 22, is arranged within in the intended gap G. In this instance, while protruding portion 22 extends in a direction away from trailer 200 primarily in a direction of the gap reducer panel height $H_{20}$ and to cantilevered end $E1_{20}$, it also extends partially in a direction transverse to both the panel height $H_{20}$ and panel length $L_{20}$, such as to extend towards a widthwise centerline $CL_{200}$ of trailer 200 in the installed arrangement. In this instance, with specific reference to FIG. 3, the portion of protruding portion 22 extending towards a widthwise centerline $CL_{200}$ extends along an arcuate path. The arcuate path may form any desired arcuate path, while in certain instances, the arcuate path is defined by a constant radius, such as a radius ranging from 700 millimeters to 900 millimeters. At the cantilevered end $E1_{20}$, it is noted that optionally, one or more bends 26 are shown arranged within panel 20 to provide improved strength and rigidity for added durability and structural integrity.

With continued reference to FIG. 3, a bi-modulus bending member 30 is employed to allow a flexible gap reducer panel 20 to bend only when a force applied thereto exceeds a threshold buckling force, and thereafter, when the force is no longer applied or is reduced below the threshold buckling force, to elastically return substantially to its original shape and orientation. Bi-modulus bending member 30 includes an elongate bending element 32. With additional reference to FIGS. 4 and 5, bi-modulus bending member 30 has a length $L_{30}$, a width $W_{30}$ and a height $H_{30}$, and a cross-section as shown extending perpendicular to the corresponding length $L_{30}$ in both the direction of width $W_{30}$ and height $H_{30}$. Likewise, elongate bending element 32 has a length $L_{32}$, a width $W_{32}$, and a height $H_{32}$, and a cross-section as shown extending perpendicular to the length $L_{32}$ in both the direction of width $W_{32}$ and height $H_{32}$. In this instance, because bi-modulus bending member 30 includes only one (1) elongate bending element 32, the cross-section is the same for both member 30 and element 32. For elongate bending element 32, length $L_{32}$ extends in the direction of bi-modulus bending member length $L_{30}$, while width $W_{32}$ and height $H_{32}$ each extend in a direction perpendicular to each other and the length $L_{32}$. With regard to bi-modulus bending member 30, each elongate bending element 32 is arranged such that its width $W_{32}$ extends in a direction of the bi-modulus bending member width $W_{30}$ and parallel to or coplanar with a central plane P (referred to as a bending plane) of bi-modulus bending member 30. Accordingly, height $H_{32}$ of each elongate bending element 32 extends in a direction perpendicular to central plane P.

With reference to FIG. 3, in an installed arrangement, the length $L_{30}$ of the bi-modulus bending member 30 extends away from the vehicle to a cantilevered end $E1_{30}$ in a direction of gap G and in a direction substantially perpendicular the gap reducer panel length $L_{20}$. Additionally, the cross-section of bi-modulus bending member 30 is arranged to buckle member 30 at the desired threshold buckling force in a desired bending direction, whereby bi-modulus bending member width $W_{30}$ is arranged to extend substantially in a direction perpendicular to the desired bending direction. As noted subsequently, in instances when one or more elongate bending elements 32 arranged within bi-modulus bending member 30 are configured to have a protruding side $PS_{32}$ and a recessed side $RS_{32}$ relative thickness $t_{32}$, whereby bi-modulus bending member 30 is also characterized as having a protruding side $PS_{30}$ and a recessed side $RS_{30}$ relative thickness $t_{30}$, because bending more easily occur in the direction of recessed side $RS_{32}$, when arranging the bi-modulus bending member 30 on a vehicle, the recessed side $RS_{32}$ is arranged to face the intended direction of bending A. This is shown in FIG. 3. Optionally, to further predispose (bias) bi-modulus bending member 30 to bend in a desired bending direction towards the trailer widthwise centerline $CL_{200}$, bi-modulus bending member length $L_{30}$ is arranged to extend from trailer 200 both in a direction away from trailer 200 (normal to front side $FS_{200}$) and in a direction towards the widthwise centerline $CL_{200}$. This bias is represented by angle α. Yet another optional mechanism for controlling the direction of bi-modulus member buckling, a tensioning member 60 is provided extending from cantilevered end $E1_{10}$ of gap reducer 10 and to structure located closer to the trailer in a direction of desired gap reducer deflection. In this example, tensioning member 60 extends from connector 50 and vehicle mounting bracket 40. As noted previously, tensioning member 60 may form any elongate member, such as a cable, rope, wire, elastic member, or the like, which is capable of applying a tensile force in an installed arrangement.

Figure 7:
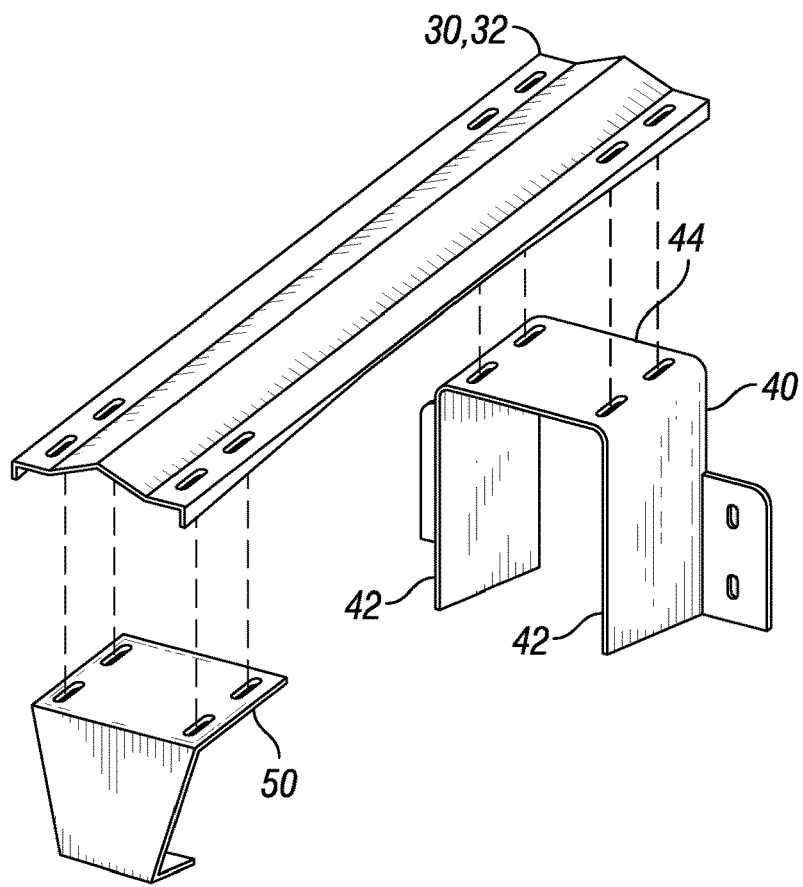
FIG. 7 is an exploded view of an assembly including a bi-modulus bending member, a trailer mounting bracket, and a gap reducer coupling member in an exemplary embodiment.

With reference to FIG. 3, bi-modulus bending member 30 is attached to trailer 200 by way of vehicle mounting bracket 40. Vehicle mounting bracket 40 in this embodiment includes a pair of legs 42 for connection to trailer 200 and a bridge portion 44 extending between legs 42 to form an attachment location for bi-modulus bending member 30. With reference to FIG. 7, an assembly shows bracket 40 in further detail. Certainly, in other variations, this bracket 40 or any other bracket could be incorporated into the bi-modulus bending member if desired, whereby any such bracket would be integral or monolithic therewith. Bracket 40 is configured to arrange bi-modulus member 30, in an installed arrangement, to extend lengthwise $L_{30}$ into gap G, which is also expressed as extending primarily in a direction of the gap reducer height $H_{10}$ or extending in a direction primarily normal to vertical side $F_{200}$ of trailer 200.

With further reference to FIG. 3, connector 50 is provided to connect bi-modulus bending member 30 to gap reducer panel 20 at cantilevered end $E1_{10}$. With reference to FIG. 7, an assembly shows connector 50 in more detail. Use of connector 50 is optional, as bi-modulus bending member 30 may be connected directly to gap reducer panel 20 with or without modification. For example, if being modified, connector 50 may be incorporated into the bi-modulus bending member 30 when being formed as a part of bi-modulus bending member 30. Connector 50 does provide a reinforced attachment, which provides additional durability to the connection.

Figure 4:
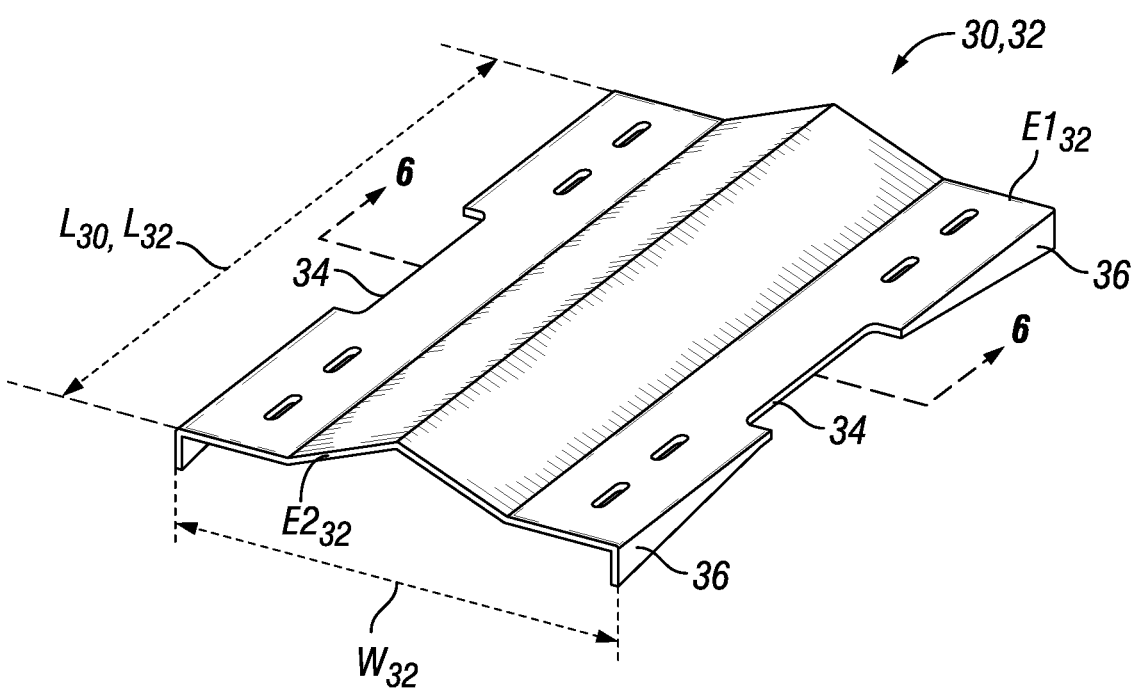
FIG. 4 is a perspective view of a bi-modulus bending member, and more specifically, and elongate bending element in accordance with an exemplary embodiment.
Figure 5:
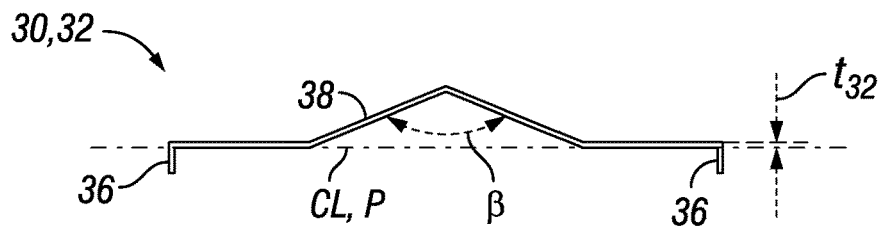
FIG. 5 is an end view of the bi-modulus bending member shown in FIG. 4, representing a cross-section at an end of the elongate bending element.
Figure 6:
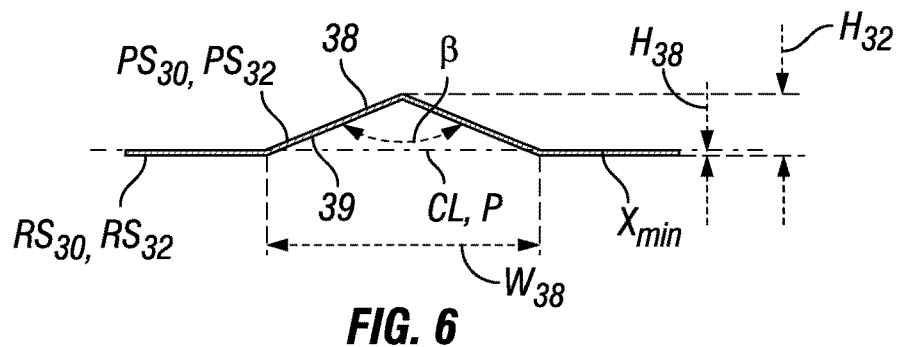
FIG. 6 is a sectional view taken along line 5-5 in FIG. 4.

With reference to FIGS. 4-6, a bi-modulus bending member 30 is shown to comprise a single elongate bending element 32.

With specific reference to FIGS. 5 and 6, elongate bending element 32 is shown. As noted previously, elongate bending element 32 has a length $L_{32}$, width $W_{32}$, and height $H_{32}$. It is also noted that elongate bending element 32 is a thin-walled member, having a thickness $t_{32}$. As such, thickness $t_{32}$ is small relative to the length $L_{32}$, height $H_{32}$, and width $W_{32}$. Elongate bending element 32 is formed of spring steel, but may instead be formed of any other material contemplated herein. Likewise, thickness $t_{32}$ may measure any thickness contemplated herein. It is noted that thickness $t_{32}$ is shown to be constant, but may vary as otherwise contemplated herein.

With continued reference to FIG. 6, at a desired bending location along the length $L_{32}$ of each elongate bending element 32 is characterized as having a cross-sectional shape configured to achieve a bi-modulus cross-section, where a bi-modulus cross-section forms a bi-stable structure that is stable in two cross-sectional shapes. In this case, the two cross-sectional shapes are unbuckled and buckled cross-sections. This bi-modulus cross-section extends a desired height $H_{32}$ and width $W_{32}$ of the elongate bending element and is asymmetric relative to a centerline CL extending across the cross-section in the direction of the elongate bending element width $W_{32}$, the centerline CL being arranged midway along the elongate bending element height $H_{32}$. In being asymmetric, the cross-section has a protruding side and a recessed side, meaning, on one side of the thickness, at least a portion of the cross-section protrudes outwardly in the direction of height $H_{32}$, termed herein as a protrusion 38. On the other side of the thickness $t_{32}$ associated with protrusion 38 is a corresponding recess 39. With regard to the cross-section, the side of thickness $t_{32}$ from which protrusion 38 extends outwardly in a direction away from centerline CL is referred to as a protruding side $PS_{32}$ of thickness $t_{32}$ while the opposing side of thickness $t_{32}$ corresponding to protrusion 38 is referred to as a recessed side $RS_{32}$ of thickness $t_{32}$. As a result, when arranging such an elongate bending element 32 or a plurality thereof in a stacked arrangement within a bi-modulus bending member 30, bi-modulus bending member 30 is also characterized as having a protruding side $PS_{30}$ and a recessed side $RS_{30}$ relative thickness $t_{30}$. It is appreciated that bending may occur more easily in the direction of the recessed side $RS_{30}$. Therefore, when it is desirous for the bi-modulus bending member 30 to bend in a certain direction, aligning the bi-modulus bending member 30 such that the recessed side $R_{S30}$ faces the certain bending direction may be desired.

With reference to FIG. 6, the cross-section of elongate bending element 32 is formed of linear components to form a "V" shape. The outer side of the "V" is protruding side $PS_{32}$ of the cross-section/cross-sectional thickness, while the inner side of the "V" is the recessed side $RS_{32}$ of the cross-section/cross-sectional thickness. The protruding side $PS_{32}$ in this instances can also be referred to as a convex side and the recessed side $RS_{32}$ as a concave side. In this instance, the "V" shape forms one central portion of the cross-section, and is referred to as a protrusion 38, as other portions of the cross-section extend substantially in the direction of elongate bending element width $W_{32}$, where substantially in this instance connotes being within 5 degrees of being parallel with the widthwise direction $W_{32}$. In this instance, protrusion 38 is located midway (centered) across the cross-section width $W_{32}$.

Protrusion 38 can be described as a having a height $H_{38}$ extending from portions of the cross-section extending substantially parallel to the widthwise direction $W_{32}$. In certain exemplary instances, height $H_{38}$ is equal to a distance of 6 to 20 mm. It is appreciated that for any "U" or "V" shape, the legs of each may be biased relative to the direction of height $H_{32}$ (that is, a direction normal to the widthwise direction $W_{32}$), such that an angle β greater than zero (0) separates the legs. For example, angle β may comprise any angle ranging from 140 to 160 degrees. Lastly, protrusion 38 can be described as a having a width $W_{38}$ (a maximum width) equal to a distance of 40 to 100 mm Height $H_{38}$ of the cross-section is less than width $W_{38}$.

Figure 10:
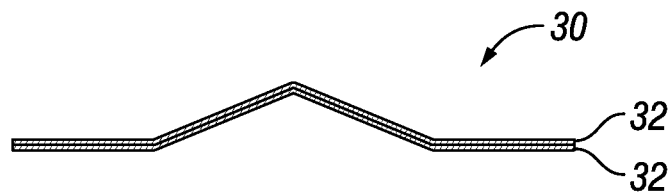
FIG. 10 is a sectional view of a bi-modulus bending member comprising multiple, stacked elongate bending elements in an exemplary embodiment.
Figure 11:
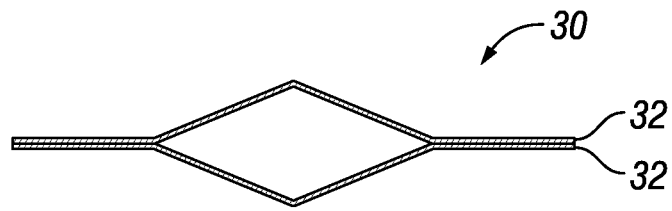
FIG. 11 is a sectional view of a bi-modulus bending member comprising multiple elongate bending elements, where the elongate bending elements are arranged such that the recessed side of each elongate bending elements faces the other.
Figure 12:
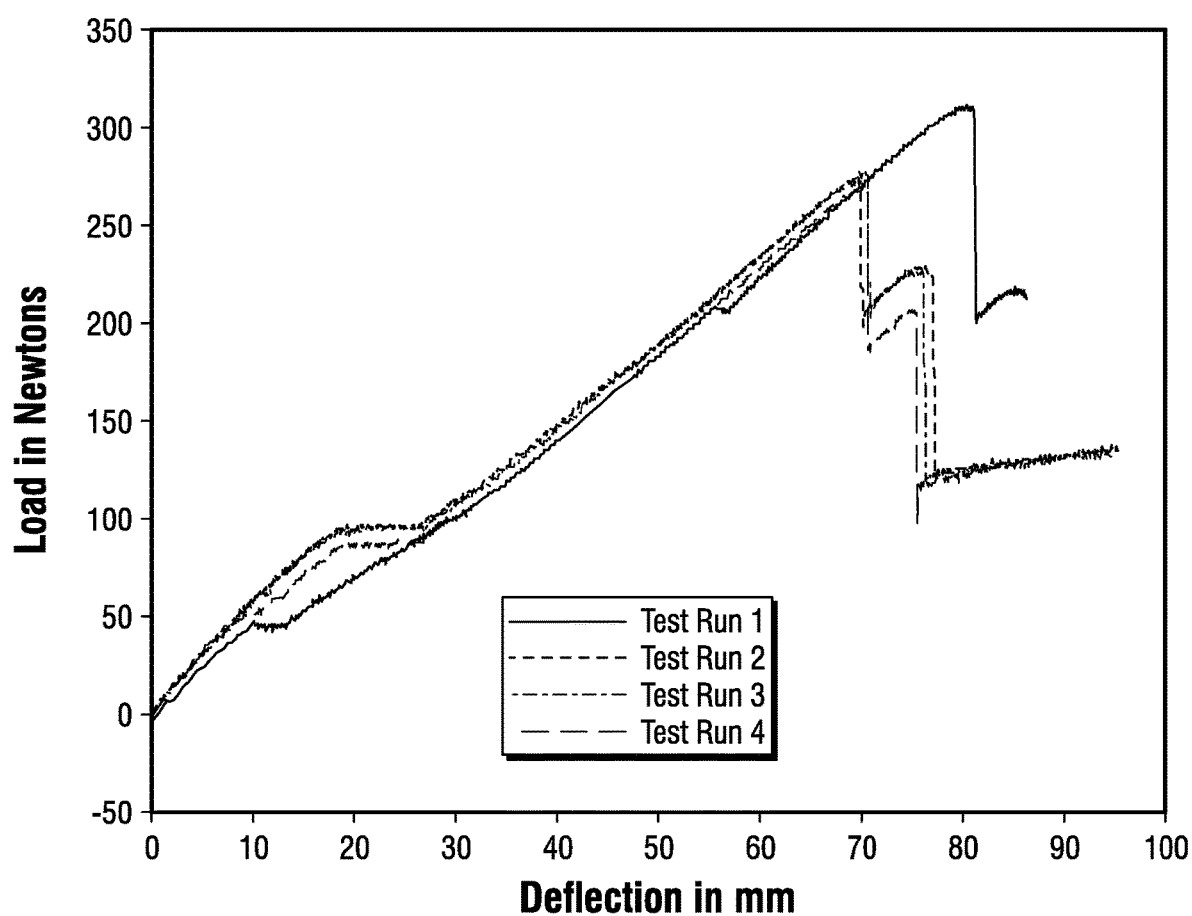
FIG. 12 shows a graph showing a load-deflection curve of a bi-modulus bending member; and, FIG. 13 is an enlarged top view of section 13 from FIG. 2, showing a gap reducer arranged along a rear side of the tractor, along a vertical surface thereof.

With reference to FIG. 10, multiple elongate bending elements 32 are arranged in a stacked arrangement where for the stacked elements, an upper stacked element and a lower stacked element are arranged such that a recessed side $RS_{32}$ of the upper stacked element 32 is arranged to face a protruding side $PS_{32}$ of the lower stacked element 32. With reference to FIG. 11, a first element 32 is arranged relative to a second element 32 such that a recessed side $RS_{32}$ of the first element 32 faces a recessed side $RS_{32}$ of the second element 32. In such instances, the resulting bi-modulus bending member is configured to more willingly bend in opposing directions since there are equal quantities of elements 32 on each side of a dividing line L. In each of these instances, the lengths of all elongate bending elements extend in the same direction, that is, in the direction of the bi-modulus bending member length.

With reference to FIG. 4, elongate bending element 32 includes a location of minimum cross-section $X_{min}$ at line 6-6. In this instance, this location of minimum cross-section $X_{min}$ is formed by opposing recesses 34 effectively reducing elongate bending element width $W_{10}$ and thereby the cross-section of elongate bending element 32. This minimum cross-section $X_{min}$ is optionally provided for the purpose of controlling the location at which buckling will occur along elongate bending element length $L_{32}$, as bending rigidity is lowest at this location of minimum cross-section $X_{min}$. In addition, or in the alternative, a location of minimum cross-section $X_{min}$ may be formed by adding cross-section to surrounding areas, to relatively increase the bending rigidity in those surrounding areas. For example, gussets 36 are provided nearest opposing ends $E1_{32}$, $E2_{32}$ on both sides of width $W_{32}$.

Figure 8:
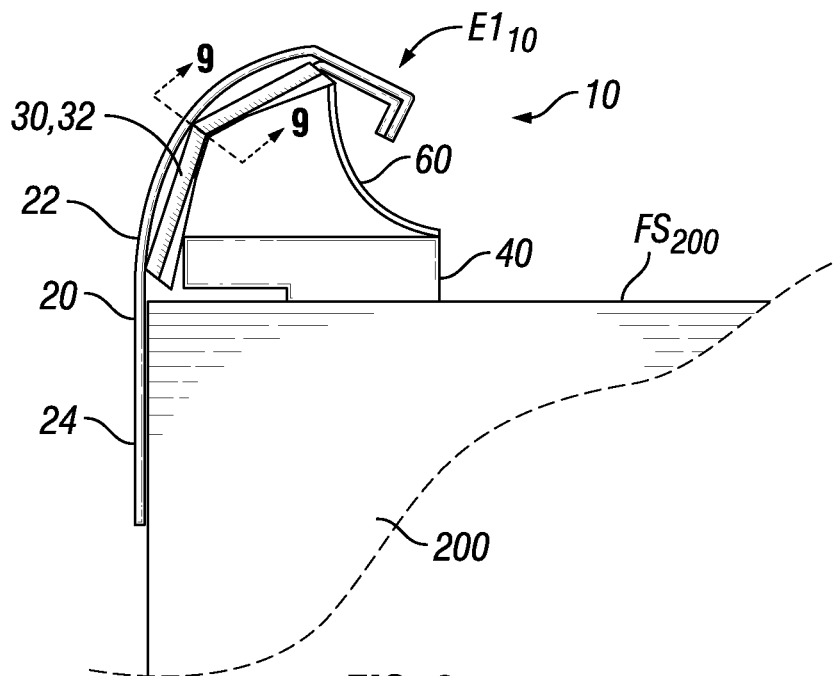
FIG. 8 shows the gap reducer of FIG. 3 in a deflected arrangement.
Figure 9:
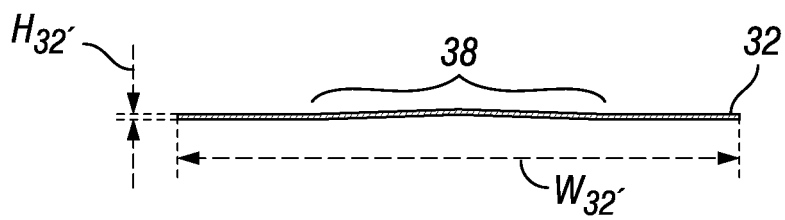
FIG. 9 shows the cross-section of bi-modulus bending member taken along line 9-9 in FIG. 8.

In FIG. 3, bi-modulus bending member 30 is shown to extend outwardly, in a forward direction, from vehicle mounting bracket 40 in an unbent and unbuckled configuration. In this configuration, bi-modulus bending member is substantially straight and rigid as it resists applied forces (such as lateral or side forces) below a threshold buckling force (buckling threshold) that otherwise would bend and buckle the bi-modulus bending member at a location along its length. Such applied forces at least result from airflow during vehicle operation. In this configuration, the bi-modulus bending member is characterized as having a first bending modulus. After force components exceeding the threshold buckling force are transmitted to the bi-modulus bending member, the bi-modulus bending member buckles elastically (that is, without or with negligible plastic deformation) as it transitions to a flexible state having a reduced bending modulus as the cross-section of the bi-modulus bending member changes locally at the buckling location. This is best seen in FIG. 7, where the bi-modulus bending member 30 is shown in a bent and buckled configuration. In this configuration, it is apparent that the cross-section of the bi-modulus bending member collapses to narrowed height and to a reduced bending modulus, as can be better observed in FIG. 8. Upon removal of the threshold buckling force, bi-modulus bending member returns to an unbuckled configuration, substantially returning itself (and any attached gap reducer panel) to its rigid position without or with negligible plastic deformation. While aspects herein refer to lateral forces, buckling can also occur due to a longitudinal force transmitted substantially aligned with the length of the bi-modulus bending member. In other words, when bending, the bi-modulus bending member buckles, whereby the cross-section shape changes from a first cross-section shape to a second cross-section shape of reduced height. With continued reference to FIG. 8, gap reducer panel 20 and bi-modulus bending member 30 are shown in a buckled configuration, bent in a direction of the trailer widthwise centerline $CL_{200}$. In particular, with reference to FIG. 9, in a buckled configuration, elongate bending element 32 has a collapsed and narrowed cross-sectional height $H_{32}'$, resulting in the simultaneous extension in cross-sectional width $W_{32}'$. In this buckled configuration, the bending modulus and resistance to bending is reduced, in turn permitting bi-modulus bending member 30 and gap reducer panel 20 to deflect inwardly as required with less resistance upon reaching a threshold buckling force.

FIG. 11 is a graph providing load-deflection curves resulting from various tests conducted using the bi-modulus bending member described in FIGS. 4-6, where the elongate bending element (32) was characterized as having a protrusion height ($H_{38}$) of 0.65 inches. For each of the four (4) tests conducted, lateral forces were applied at a rate of 2 inches of deflection per minute. What is clearly evident for each test conducted is the sudden drop in load required to continue deflecting the bi-modulus bending member. This sudden drop occurs at a threshold buckling force, which is the instance when the bi-modulus bending member buckles and narrows in height to permit bending with much less resistance by operating at different bending modulus characterized by the narrowed cross-sectional height.

Figure 13:
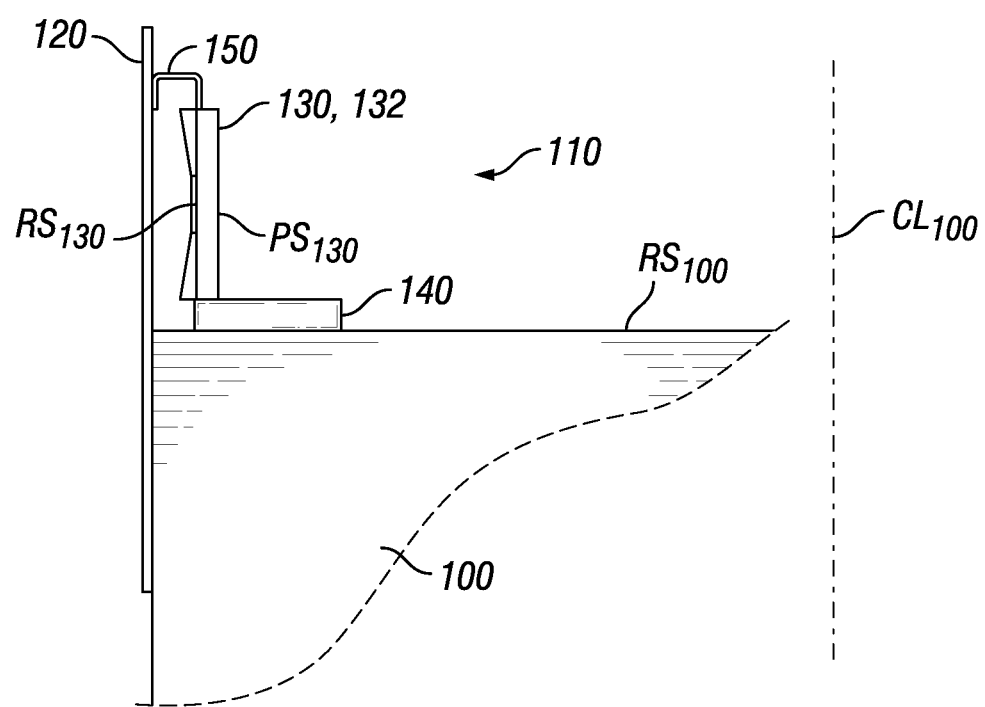

As stated previously, any gap reducer discussed herein may be applied to any vehicle. Accordingly, with reference to FIGS. 1 and 2 a gap reducer 110 is operably attached to the backside of tractor 100, backside being a vertical side of tractor 100. With additional reference to FIG. 13, it is appreciated that gap reducer 110 operates under the same principles and in the same manner as gap reducer 10, except that, in this instance, gap reducer 110 is adapted to deflect outwardly away from a widthwise tractor centerline $CL_{100}$ (and also from a widthwise trailer centerline (not shown)) instead of deflecting inwardly as is gap reducer 10. This is achieved by (1) orientating bi-modulus bending member 130 (formed of a single elongate bending element 132) to bend outwardly by orienting the recessed side $RS_{130}$ of its cross-sectional shape to face the intended direction of bending while protruding side $PS_{130}$ is shown opposite, and (2) not biasing bi-modulus member 130 inward, but rather extending member 130 lengthwise in a direction parallel or slightly outward relative to widthwise tractor centerline $CL_{100}$. Additionally, in an unbuckled state, the gap reducer panel 120 of gap reducer 110 is planar, and is not bent inward as is gap reducer panel 20 of gap reducer 10. Vehicle mounting bracket 140 and connector 150, synonymous with those employed with gap reducer 10 are also shown in exemplary embodiments, but which have been adapted for this particular installation.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While the methods and apparatus have been described with reference to particular embodiments thereof, it shall be understood that such description is by way of illustration only and should not be construed as limiting the scope of the claimed inventions. Accordingly, the scope and content of the disclosure are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A method of mounting a gap reducer to a vehicle, comprising:
   attaching operably a bi-modulus bending member to a first vehicle in a cantilevered configuration along a vertical side of the first vehicle, where a cantilevered end of the bi-modulus bending member is arranged to extend within a gap arranged between the first vehicle and a second vehicle when the first and second vehicles are coupled,
   the bi-modulus bending member comprising an elongate bending element having a length, width, and height, each extending perpendicular to the other, the elongate bending element also having a cross-section extending perpendicular to the length in both the direction of the width and in the direction of the height of the elongate bending element, the width being greater than the height in an unbuckled arrangement and the cross-section of the elongate bending element being asymmetric relative to a centerline extending in the direction of the elongate bending element width, the centerline located midway along the height, where each of the bi-modulus bending member and the elongate bending element is configured to elastically buckle and bend to a buckled configuration when a force component exceeds a threshold buckling force, and to elastically return to an unbuckled configuration when the force component is reduced below the threshold buckling force, and,
   coupling operably a gap reducer panel to the bi-modulus bending member, the gap reducer panel having a length extending primarily in a vertical direction and a height extending perpendicular to the length, where the gap reducer panel height extends in a direction away from the first vehicle and to the cantilevered end of the bi-modulus bending member.

2. The method of claim 1, where the elongate bending element is a thin-walled member, and where for the cross-section of the elongate bending element, one side of a thickness of the elongate bending element is a protruding side and the other side opposite the protruding side relative to the thickness is a recessed side.

3. The method of claim 2, where the bi-modulus bending member has a cross-section extending perpendicular to the length in both a direction of the width and the height of the bi-modulus bending member, the bi-modulus bending member width being greater than the bi-modulus bending member height in the unbuckled arrangement and the cross-section of the bi-modulus bending member being asymmetrical relative to a direction of the bi-modulus bending member width, one side of a thickness of the bi-modulus bending member is the protruding side and the other side opposite the protruding side relative to the bi-modulus bending member thickness is the recessed side, where the bi-modulus bending member is arranged such that the recessed side faces an intended direction of the bi-modulus member bending.

4. The method of claim 2, where the elongate bending element cross-section is "U" or "V" shaped.

5. The method of claim 4, where a portion of the elongate bending element cross-section includes a "U" or "V" shaped portion.

6. The method of claim 5, where the "U" or "V" shaped portion is arranged centrally across the elongate bending element width.

7. The method of claim 1, where for the elongate bending element a height of the cross-section in a buckled arrangement is less than the height of the cross-section in the unbuckled arrangement, and where for the bi-modulus bending member, a height of the bi-modulus bending member cross-section in the buckled arrangement is less than the height of the bi-modulus bending member cross-section in the unbuckled arrangement.

8. The method of claim 1, where the elongate bending element thickness is constant.

9. The method of claim 1, where the bi-modulus bending member length extends outwardly from the vertical side at an angle less than 90 degrees relative to the vertical side and towards a center of the vertical side.

10. The method of claim 9, where the bi-modulus bending member length extends from the first vehicle in a direction away from the first vehicle and in a direction towards a widthwise centerline of the first vehicle extending lengthwise along a first vehicle length.

11. The method of claim 10, where in extending to the cantilevered end, a portion of the gap reducer panel extends towards the widthwise centerline.

12. The method of claim 11, where the portion of the gap reducer panel extending towards a widthwise centerline extends along an arcuate path.

13. The method of claim 12, where the arcuate path is defined by a constant radius.

14. The method of claim 1, where the first vehicle is a trailer, and the vertical side is a front end side of the trailer.

15. The method of claim 1, where the first vehicle is a tractor, and the vertical side is a rear end side of the tractor.

16. The method of claim 1, where attaching operably a bi-modulus bending member to the first vehicle is achieved by operably attaching a vehicle mounting bracket to the first vehicle, the bi-modulus bending member being operably attached to the vehicle mounting bracket.

17. The method of claim 1, further comprising a step of operably fixing an additional portion of the gap reducer panel to the first vehicle.

18. The method of claim 1, where a tensioning member is operably attached to a cantilevered end of the gap reducer and a structure arranged closer to the first vehicle and in a direction towards a widthwise centerline of the first vehicle extending lengthwise along a vehicle length.

19. The method of claim 1, where the bi-modulus bending member elastically returns to the unbuckled configuration when the force component is reduced to a force component below a threshold unbuckling force, the threshold unbuckling force being less than the threshold buckling force.

20. A gap reducer apparatus comprising:
   a vehicle mounting bracket configured for mechanically coupling the apparatus to a vertical side of a vehicle; and,
   a bi-modulus bending member comprising an elongate bending element having a length, width, and height, each extending perpendicular to the other, the elongate bending element also having a cross-section extending perpendicular to the length in both the direction of the width and in the direction of the height of the elongate bending element, the width being greater than the height in an unbuckled arrangement and the cross-section of the elongate bending element being asymmetric relative to a centerline extending in the direction of the elongate bending element width, the centerline located midway along the height, where each of the bi-modulus bending member and the elongate bending element is configured to elastically buckle and bend to a buckled configuration when a force component exceeds a threshold buckling force, and to elastically return to an unbuckled configuration when the force component is reduced below the threshold buckling force.

* * * * *